United States Patent [19]

Altes et al.

[11] Patent Number: 5,973,023
[45] Date of Patent: Oct. 26, 1999

[54] SEALANTS CONTAINING FUNGICIDES EXHIBITING LESS CHROMOPHORIC DEVELOPMENT UPON EXPOSURE TO UV BY THE INCORPORATION OF ZINC OXIDE

[75] Inventors: Michael Gene Altes; Virginia Kay O'Neil; Arthur James Tselepis; Andreas Thomas Franz Wolf, all of Midland, Mich.

[73] Assignee: Dow Corning Corporation, Midland, Mich.

[21] Appl. No.: 08/628,171

[22] Filed: Apr. 4, 1996

[51] Int. Cl.⁶ ...................................................... C08K 5/42
[52] U.S. Cl. .......................... 523/122; 524/172; 524/864; 528/34
[58] Field of Search ............................ 523/122; 524/172, 524/864; 528/34

[56] References Cited

U.S. PATENT DOCUMENTS

| | | | |
|---|---|---|---|
| 3,950,258 | 4/1976 | Imai et al. ................................. | 252/33 |
| 4,460,740 | 7/1984 | Arai ......................................... | 524/724 |
| 4,529,749 | 7/1985 | Favre et al. ............................... | 523/122 |
| 4,670,471 | 6/1987 | Foscante et al. .......................... | 523/122 |
| 4,695,603 | 9/1987 | Inoue et al. ............................... | 524/723 |
| 5,357,025 | 10/1994 | Altes et al. ................................ | 528/42 |
| 5,436,284 | 7/1995 | Honda et al. ............................. | 523/122 |
| 5,534,563 | 7/1996 | Lin et al. ................................... | 523/122 |

FOREIGN PATENT DOCUMENTS

| | | | |
|---|---|---|---|
| 81300131 | 2/1981 | European Pat. Off. ..................... | 83/4 |
| 034877 | 9/1981 | European Pat. Off. . | |
| 76452 | 6/1981 | Japan . | |

*Primary Examiner*—Robert Dawson
*Assistant Examiner*—D. Aylward
*Attorney, Agent, or Firm*—William F. Boley; Roger H. Borrousch

[57] ABSTRACT

The discoloration of a non-acidic room temperature vulcanizable silicone sealant containing a ultraviolet radiation degradable fungicide is delayed by adding zinc oxide.

25 Claims, No Drawings

SEALANTS CONTAINING FUNGICIDES EXHIBITING LESS CHROMOPHORIC DEVELOPMENT UPON EXPOSURE TO UV BY THE INCORPORATION OF ZINC OXIDE

BACKGROUND OF THE INVENTION

1. Field of the Invention

This invention relates to room temperature vulcanizable silicone sealants containing fungicides.

2. Background Information

Silicone compositions which cure to produce elastomers at room temperature are widely used as sealants and caulking materials because they have a unique property profile for applications, such as in building construction. These properties include excellent weatherability, resistance to heat, maintaining their flexibility at low temperatures, ease of application, and rapid cure in place. However, the silicone sealants over a period of time often become dirty or stain the surrounding substrates adjacent to them. This creates an unattractive appearance and cleaning the dirt off the sealant and the stain off the adjacent building materials is expensive and often the results are unsatisfactory. It is therefore the hope of the construction industry to have a silicone sealant developed which does not become dirty or stain the adjacent building materials. Many methods have been proposed to eliminate the problems of dirt pick-up and staining encountered with the use of room temperature vulcanizable (hereinafter referred to as RTV) silicone sealants in construction.

Some of the approaches to overcoming the staining problems and the dirt pick-up problems are the use of surfactants described by Arai in U.S. Pat. No. 4,460,740, issued Jul. 17, 1984, by Inoue et al in U.S. Pat. No. 4,695,603, issued Sep. 22, 1987, and in Japanese Kokai (Laid Open) Patent Publication No. 56-76453, and Japanese Kokai Patent Publication No. 56-76452, both assigned to Toshiba Silicone KK, and published on Jun. 24, 1981.

An especially successful approach to eliminating the dirt pick-up and the staining problems is described by Altes et al in U.S. Pat. No. 5,357,025, issued Oct. 18, 1994. Altes et al describe the use of a siloxaphobic agent which contains per molecule at least one perfluorocarbon group of the formula $C_xF_{(2x+1)}$— where x has an average value of at least 6. Using this siloxaphobic agent in combination with a drying oil results in a particularly useful sealant with good resistance to dirt pick-up and little or no staining of adjacent materials. Altes et al is hereby incorporated by reference to show RTV silicone sealant compositions which provide resistance to dirt-pick-up and staining, especially those which contain a drying oil. The inventors found that when RTV silicone sealants containing drying oil were used, the surface of the cured silicone sealant which had a drying oil oxidation product layer gradually disappeared and its effectiveness for remaining clean was reduced. However, a drying oil surface layer on a sealant exposed to the outside environment often experiences an additional problem, the formation of fungus on its surface which is as much of a problem aesthetically as the dirt pick-up or the staining. One solution to eliminate or at least retard the growth of fungus on the surface of a sealant is to include a fungicide in the formulation. The use of a fungicide can lead to other difficulties. For example, some of the known fungicides can cause other unsatisfactory property changes. Some fungicides are effective, but degrade (chemically altered) when exposed to ultraviolet radiation (hereinafter referred to as UV), become ineffective and can discolor the sealant. Once a sealant is discolored, removal of the discoloration is not practical. It is therefore the desire to overcome these problems.

SUMMARY OF THE INVENTION

It is therefore an object of this invention to provide an RTV sealant containing a fungicide which avoids the above stated problems.

This invention relates to a non-acidic room temperature curable silicone sealant composition comprising a polymer with moisture condensable silyl ends, a crosslinking agent, a filler, an ultraviolet radiation degradable fungicide, and at least 2 parts by weight of particulate zinc oxide per 100 parts by weight of the polymer.

DETAILED DESCRIPTION OF THE PREFERRED EMBODIMENTS

The composition of the present invention is a non-acidic RTV silicone sealant composition which cures to provide sealant where UV exposed surfaces resist discoloration from the degradation of a fungicide. This resistance to discoloration is achieved by the presence of particulate zinc oxide in the RTV silicone sealant composition when the amount is at least 2 parts by weight per 100 parts by weight of the polymer in the RTV silicone sealant composition. Preferably, the zinc oxide is present in amounts from 2 to 15 parts by weight per 100 parts by weight of polymer, more preferably from 3 to 10 parts by weight per 100 parts by weight of polymer.

For the purposes of this invention, the use of the terms "degrade" or "degradation" by UV means that the fungicide is chemically altered by exposure to UV and discolors as it forms compounds which have permanently developed chromophoric properties. Yellowing is a frequently encounter discoloration found from the degradation of fungicides by UV.

There are many known fungicides for every kind of situation. Some of these fungicides are not desirable in sealant formulations. Some fungicides have the disadvantage that they are degradable by UV. The degradation of the fungicide causes the cured sealant to become a very unattractive color which can be as displeasing as the sealant dirt pick-up or substrate staining observed with construction sealant. The applicants have discovered that by adding to non-acidic RTV silicone sealants containing a UV degradable fungicide, particulate zinc oxide in amounts of at least 2 parts by weight per 100 parts by weight of polymer of the RTV silicone sealant composition, that the cured sealant resists the formation of color during long exposures to UV. It is a great advantage to have a sealant which can contain a fungicide and which also does not discolor when exposed to UV. Another advantage of compositions which do not discolor, is the ability to have color matching stability. In situations where the color of a sealant is matched to an adjacent substrate, it is important to have the color remain constant, because discoloration can cause unsightly changes in the sealant and destroy the aesthetics of a construction. Particularly advantageous non-acidic RTV silicone sealants are those which form a drying oil surface layer which exhibits reduced dirt pick-up, and even more preferred are those non- acidic RTV silicone sealants which contain a siloxaphobic agent, for example those which contain at least one $C_xF_{(2x1)}$— groups per molecule.

Fungicides suitable for this invention are those which are UV degradable. One such fungicide is diiodomethyl p-tolyl sulfone.

The RTV silicone sealant composition comprises those RTV silicone compositions known in the art and for this invention are those where the hydrolysis of the hydrolyzable (condensable) group produces a non-acidic leaving compound and for the purposes of this application are termed "non-acidic" RTV silicone sealant compositions and comprise a polymer having condensable silyl end groups, a moisture sensitive silicon-crosslinker, a filler, and optionally a curing catalyst for the composition.

The polymers include polydiorganosiloxanes having condensable end groups and primarily made up of diorganosiloxane units ($R'_2SiO$). Small amounts of other siloxane units may be present, such as monoorganosilsesquioxane units or $SiO_2$ units which provide branching and triorganosiloxy units which provide terminations of the polymer chains. R' is a monovalent hydrocarbon radical or a halogenated monovalent hydrocarbon radical. Examples of monovalent hydrocarbon radicals are alkyl radical such as methyl, ethyl, propyl, and n-octyl,; alkenyl radicals such as vinyl and allyl; aryl radicals such as phenyl or tolyl; cycloalkyl radicals such as cyclohexyl, and aralkyl radicals such as 2- phenylethyl. Examples of halogenated monovalent hydrocarbon radicals are perfluoroalkylethyl radicals such as 3,3,3-trifluoropropyl, and another halogenated radical is gamma-chloropropyl. The polydiorganosiloxanes useful in this invention are those which contain condensable end groups which can be hydroxyl groups, or hydrolyzable groups such as silicon-bonded alkoxy groups, ketoximo groups, amino groups, amido groups, aminoxy groups, and alkenoxy groups. Polydiorganosiloxanes which contain the hydrolyzable groups generally have chain terminating siloxane units of the formula $Si(X)_y(R')_{(3-y)}$ in which R' is a monovalent hydrocarbon radical or a halogenated hydrocarbon radical, X is a hydrolyzable group, and y is 1,2,or 3.

The moisture sensitive crosslinker is a silicon compound which contains at least two hydrolyzable groups per molecule, preferably more than two hydrolyzable groups per molecule. The hydrolyzable groups are those where the leaving groups are non-acidic. In those situations in which the polydiorganosiloxane contains more than two hydrolyzable groups per molecule, the crosslinker can have two hydrolyzable groups per molecule. The moisture sensitive crosslinkers can be silanes or partially hydrolyzed products of the silanes. Examples of silicon- bonded hydrolyzable groups on the crosslinkers are alkoxy groups, ketoximo groups, amido groups, amino groups, aminoxy groups, and alkenoxy groups. Examples of alkoxy groups are methoxy, ethoxy, n-propoxy, isopropoxy, and methoxyethoxy. Examples of ketoximo groups are dimethylketoximo, methylethylketoximo, methylpropylketoximo, methylbutylketoximo, and diethylketoximo. Examples of amino groups are N,N-diethylamino, N-ethylamino, N-propylamino, N,N-methylcyclohexylamino, N-butylamino, and N-cyclohexylamino. Examples of akenyloxy groups are propenoxy, isopropenoxy, and butenoxy. Examples of amido groups are N-methylacetamido, N-ethylacetamido, N-butylacetylamido, and N- methylbenzamido. Example of aminoxy groups are N,N-dimethylaminoxy, N,N-methylethylaminoxy, and N,N-diethylaminoxy.

Examples of crosslinkers are methyltrimethoxysilane, methyltriethoxysilane, vinyltrimethoxysilane, methylphenyidiethoxysilane, 3,3,3-trifluoropropyltrimethoxysilane, methyltri(methylethylketoximo)silane, vinyltri(methylethylketoximo)silane, ethyltri(N,N-diethylamino) silane, dimethyidi(N,N-dibutylamino)silane, vinyltri(N-methyl-N-cyclohexylamino)silane, methyltri(N-methylacetamido)silane, methylvinyldi(N-methylacetamido)silane, methyltri(isoprenoxy)silane, n-propylorthosilicate, and ethylpolysilicate.

The crosslinker is used in amounts which are conventionally used for making curable silicone elastomeric compositions and which cure at room temperature. The amounts used will vary depending upon the particular crosslinker chosen and the properties of the cured elastomer desired. Preferably the crosslinker is present in amounts of from 0.5 to 15 parts by weight per 100 parts by weight of the polymer.

A mixture of polydiorganosiloxane and crosslinker will usually cure at room temperature when exposed to moisture, however, sometimes this time period is too slow for practical applications and it is desirable to accelerate the cure rate and reduce the time to cure composition. In these situations, a catalyst is used. These catalysts include metal salts of carboxylic acids such as dibutyl tin dilaurate, dibutyl tin diacetate, and tin 2-ethylhexoate; organotitanates such as tetrabutyl titanate, tetra-n-propyl titanate, diisopropoxy-di (ethoxyacetoacetyl) titanate, and bis(acetylacetonyl) diisopropyl titanate.

In order for the RTV silicone compositions to have desirable properties, they need to contain a filler. One or more fillers can be used. The filler can be a reinforcing filler such as fumed silica, precipitated silica, certain finely divided calcium carbonate, carbon black, and siloxane resins such as those comprised of trimethylsiloxy units and $SiO_{4/2}$ units. These reinforcing fillers can have surfaces which are treated or untreated, as is known in the art. The filler can be an extending filler such as calcium carbonate, finely divided quartz, diatomaceous earth (considered a semi-reinforcing filler), iron oxides, and titanium dioxide.

One group of preferred RTV silicone compositions contain a drying oil, which include the natural drying oils, such as tung oil, linseed oil, vernonia oil, and oiticica oil; and modified natural drying oils such as boiled linseed oil and dehydrated castor oil. Tung oil and oiticica oil are preferred because they provide the broadest utility with different kinds of RTV silicone compositions and give the most improved results An effective amount of natural drying oil is from 0.5 to 10 parts by weight per 100 parts by weight of polymer. The preferred amount of natural drying oil is from 0.5 to 4 parts by weight per 100 parts by weight of polymer Other ingredients which are conventionally used in formulating RTV silicone compositions used as sealants and caulking materials can be used in these compositions, as long as, they do not interfere with the effectiveness of the fungicide or counteract the zinc oxides ability to resist discoloration of the sealant. These ingredients include non-slump agents.

The non-acidic RTV silicone sealant compositions useful in the composition of this invention can be those known in the art. The compositions of this invention contain a UV degradable fungicide and zinc oxide as described above. A preferred composition is prepared by combining polymer with crosslinking agent and curing catalyst, if used, then filler is added, zinc oxide, and finally the drying oil, if used. The drying oil often has a tendency to separate from the remaining ingredients of the RTV silicone sealant composition during storage and therefore it is preferred to combine it with the rest of the ingredients shortly before it is to be exposed to air atmosphere for curing. When those RTV sealant compositions are to be stored and drying oil is a part of the composition, the polymer, crosslinking agent, filler, curing catalyst, fungicide, and zinc oxide are mixed and stored in one storage container and the drying oil is stored in a second storage container, and then the contents of the two containers are mixed shortly before applying the composition as a sealant or caulking material and exposing it to atmospheric moisture and allowing it to vulcanize. Non-acidic RTV silicone sealant compositions which are available commercially can be used and the fungicide and zinc oxide can be blended with them. The fungicide is preferably added to the RTV silicone sealant composition after the zinc oxide is mixed into the formulations. In the following illustrations of various non-acidic RTV silicone sealant compositions, it is understood that these are known, but that the addition of the UV degradable fungicide and zinc oxide were not part of the known composition.

After the composition is obtained, it is exposed to moisture, such as atmospheric moisture until a cured elastomeric surface is obtained. Different RTV silicone compositions will cure at different rates, however, one can estimate the time to achieve surface cure by checking the surface to see if it is tacky. If lightly touching the surface with a finger, a tackiness is observed the surface has not yet reached the cured state, however, if no tack is observed, the surface is considered cured. It is usually desired to have the surface reach the cured state in a few hours to one day to avoid dust and dirt from blowing onto and adhering to the surface.

Cured silicone elastomeric surfaces are known to have glossy to highly glossy surfaces. If, however, a drying oil is present, the surfaces of the cured composition become dull and have a velvet appearance over a period of time, i.e. a dull surface or finish, also known as a matte finish (mat finish). As the cured surface of the sealant becomes dull, this is the drying oil layer forming on the air exposed surface and oxidation is taking place.

One preferred RTV silicone sealant composition is obtained by mixing a hydroxyl endblocked polydiorganosiloxane, a filler, and as the moisture sensitive crosslinker, a ketoximosilicon crosslinker having at least three silicon-bonded ketoximo groups per molecule. A ketoximo-silicon compound can be a mixture of ketoximosilanes and alkoxyketoximosilanes. One such ketoximosilane mixture comprises methyltri(methylethylketoximo)silane, methyldi(methylethylketoximo)methoxysilane, and methyldimethoxy(methylethylketoximo)silane and another ketoximosilane mixture comprises a mixture of tetraketoximosilane, ethoxytri(methylethylketoximo)silane, diethoxydi(methylethylketoximo)silane, and triethoxy (methylethylketoximo)silane. The latter mixture is known in the art, for example in U.S. Pat. No. 4,657,967, issued to Klosowski et al on Apr. 14, 1987, and in U.S. Pat. No. 4,973,623, issued to Haugsby et al on Nov. 27, 1990, both of which are hereby incorporated by reference to show ketoximosilane mixtures and RTV silicone compositions made using the ketoximosilane mixtures. RTV silicone compositions made from these ketoximosilane mixture preferably contain a catalyst, for example a tin catalyst such as dibutyl tin dilaurate, or a titanate catalyst such as diisopropoxy di(ethoxyaceto-acetyl) titanate. These RTV silicone compositions preferably contain a treated calcium carbonate as the filler, such as stearic acid treated calcium carbonate.

Another preferred RTV silicone composition is obtained by mixing a hydroxyl endblocked polydiorganosiloxane, an aminoxysilicon crosslinker as the moisture sensitive silicon crosslinker and also contains as part of that crosslinker but acting as a chain extender, a diorganodi(amido)silane, such as methylvinyldi(N-methylacetamido)silane. These kinds of RTV silicone compositions are known from Toporcer et al in U.S. Pat. No. 3,817,909, issued Jun. 18, 1974, and Klosowski in U.S. Pat. No. 3,996,184, issued Dec. 7, 1976, both of these patents are incorporated by reference to show the combination of aminoxysilicon crosslinkers and amidosilane chain extenders. The chain extender can be used to make low modulus sealants useful in the building construction industry. These compositions can be prepared without the use of a catalyst. Calcium carbonate is a useful filler for such compositions.

Another composition comprises a two package composition in which a first package comprises a hydroxyl endblocked polydiorgano- siloxane, and a filler, and a second package comprises the moisture sensitive silicon-crosslinker. The second package can also contain filler and a curing catalyst for the RTV silicone composition. If the drying oil is used and is not present in the first package, it may be contained in a third package. The particulate zinc oxide can be added to either package. One kind of RTV silicone composition of this kind, is where the moisture sensitive silicon-crosslinker is an alkoxysilicon crosslinker, such as n-propyl ortho silicate or ethylpolysilicate and a tin catalyst is used. These compositions are stored in separate packages to prevent premature curing which can occur if all the ingredients are mixed for too long a time period before the use of the composition.

A composition which has as the moisture sensitive crosslinker, an alkoxysilicon compound, can contain all the ingredients in one package. Storage stable compositions can be obtained when a titanate catalyst is used as the curing catalyst, the ratio of the alkoxysilicon crosslinker to the endgroups of the polydiorganosiloxane are such that there is at least one alkoxysilicon crosslinker molecule per polydiorganosiloxane endgroup. These one package RTV silicone compositions which comprise the alkoxysilicon crosslinker are described in U.S. Pat. No. 3,161,614, issued Dec. 15, 1964 to Hyde et al, U.S. Pat. No. 3,175,993, issued Mar. 30, 1965, to Weyenberg, U.S. Pat. No. 3,334,067, issued Aug. 1, 1967, and U.S. Pat. No. 4,871,827, issued Oct. 3,1989, to Klosowski et al where these patents are hereby incorporated by reference to show the formulations useful for preparing one package RTV silicone composition in which the moisture sensitive crosslinker is an alkoxysilicon compound. The natural drying oils, if used, are preferably stored in a separate container or storage compartment from the remainder of the one package RTV silicone composition and the drying oil is mixed with the RTV silicone composition shortly before it is intended to be used. The preferred natural drying oil is tung oil.

A preferred RTV silicone composition is one which contains a siloxaphobic agent in addition to the drying oil, such as described by Altes et al in U.S. Pat. No. 5,357,025. The siloxaphobic agent is a material providing a siloxaphobic surface layer to the cured composition. This siloxaphobic agent can be a fluorocarbon alcohol, a reaction product of a fluorocarbon alcohol and a hydrolyzable silane, or a mixture of the fluorocarbon alcohol and the reaction product of the fluorocarbon alcohol and the hydrolyzable silane. The fluorocarbon alcohol contains at least one perfluorocarbon group of the formula $C_xF_{(2x+1)}$— group where x has an average value of at least 6. Fluorocarbon alcohols which have fluorocarbon groups where x was less than 6 did not prevent the migration of siloxane species to the surface of the sealant. Preferably, the fluorocarbon alcohols are those with fluorocarbon groups in which x has an average value of from 6 to 20. The fluorocarbon alcohols are commercially available and are illustrated by the following formulae

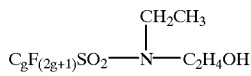

where g has a value of from 6 to 20. Commercial mixtures are sold in which g has an average of 7 and contain species in which g ranges from 6 to 10 inclusive. Such a mixture is FC-10 which is sold by Minnesota Mining and Manufacturing Company (3M), Minneapolis, Minn. Other commercial mixtures sold by 3M are FC-170C which is a fluorocarbon alcohol and has the following average formula

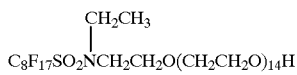

and FC-171 which is a fluorocarbon alcohol and has the following average formula

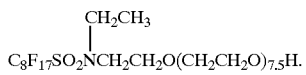

Other commercially available fluorocarbon alcohols include $C_8F_{17}CH_2CH_2OH$, and $C_xF_{(2x+1)}CH_2CH_2O(CH_2CH_2O)_fH$ where x is from 6 to 16 and f is a positive integer.

The siloxaphobic agent is preferably a reaction product of a fluorocarbon alcohol and a hydrolyzable silane. These siloxaphobic agents are siloxaphobic reaction product mixtures which are made by mixing at least 0.01 mole of the fluorocarbon alcohol with one mole of the hydrolyzable silane under conditions which exclude moisture from contacting the ingredients, preferably 0.1 mole of fluorocarbon alcohol per one mole of hydrolyzable silane. Fluorocarbon alcohols can be used by themselves but some are solid at room temperature and handling and mixing with the other ingredients is not fully acceptable. The fluorocarbon alcohols are described above and the hydrolyzable silanes are those defined above as the crosslinking agent. The resulting mixture is heated until some of the fluorocarbon alcohol reacts with the hydrolyzable silane and forms a C—O—Si bond. The resulting reaction mixture is unreacted hydrolyzable silane, unreacted fluorocarbon alcohol, and a reaction product of fluorocarbon alcohol and the hydrolyzable silane in which at least one Y group is replaced by the fluorocarbon alcohol, as illustrated by the following equation

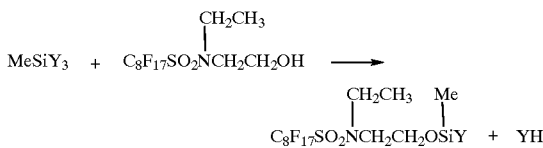

The siloxaphobic reaction product mixtures contain from >0% to 100% reaction product of fluorocarbon alcohol and silane. These reaction product mixtures provide the preferred siloxaphobic agents, especially when the reaction product of the fluorocarbon alcohol and silane is <50% of the siloxaphobic reaction mixture. A preferred siloxaphobic reaction mixture is one in which the fluorocarbon alcohol has the following formula

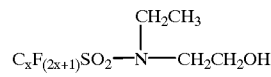

wherein x has an average value of at least 6, the hydrolyzable silane has the formula

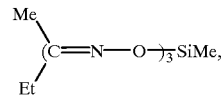

and the reaction product of the fluorocarbon alcohol and the hydrolyzable silane comprises a compound of the formula

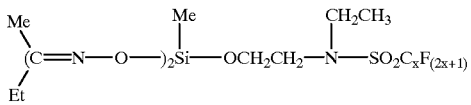

wherein x has an average value of at least 6. The siloxaphobic reaction mixture is preferred because the siloxaphobic surface layer is rapidly formed during the curing of the elastomeric polyorganosiloxane composition and the surface resists the accumulation of dirt and/or stain when the sealant is very vulnerable to dirt pick-up. The siloxaphobic reaction mixture through some unknown mechanism more readily forms the siloxaphobic surface layer than the use of unreacted fluorocarbon alcohol, i.e. the fluorocarbon alcohol is merely mixed with the other elastomeric polydimethylsiloxane composition ingredients. The siloxaphobic surface layer is regenerated over the useful life of the sealant. The siloxaphobic reaction mixture acts as a reservoir and continually renews the siloxaphobic surface layer as it becomes depleted with age. The siloxaphobic surface layer also provides a sealant which exhibits retardation of color formation of the sealant surface and the surrounding areas adjacent to the sealant which may be the result of exposure to weather. The siloxaphobic surface layer keeps the properties of the sealant from changing with age because siloxane ingredients are not readily lost by migration or evaporation, but are maintained within the sealant matrix. The siloxaphobic reaction mixture does not adversely effect the curing properties of the elastomeric polydimethylsiloxane composition, and the adhesion to various substrates, particularly those used in building construction. The siloxaphobic reaction mixture can be used in small amounts and yet provide its useful properties over long periods of time. The amounts are such that the fluorocarbon group is present in the composition in amounts of from 0.1 to 7 inclusive weight percent based on the weight of the composition, preferably from 1 to 3 weight percent.

The following examples are presented for illustrative purposes and should not be construed as limiting the present invention which is properly delineated in the claims. In the examples, part or parts is by weight and viscosities were measured at 25° C.

EXAMPLE

An RTV silicone composition was prepared by mixing under conditions which protected it against the ingress of moisture. In a mixer, 100 parts of a silanol endblocked polydimethylsiloxane having a viscosity of about 50 Pa.s, and 1 part of a ketoximosilane mixture of approximately 72 weight percent methyltri(methylethylketoximo)silane, 21 weight percent methyldi(methylethylketoximo) methoxysilane, 0.5 weight percent methyldimethoxy (methylethylketoximo)silane, and 6.5 weight percent impurities were mixed for one minutes under 74.29 kPa of vacuum, and then was allowed to stand for 30 minutes. Then, 1 part of methylvinyl-di(N-methylacetamido)silane was added and stirred for one minute under 74.29 kPa of vacuum. To the resulting mixture, 12 parts of a mixture of 2.5 parts of the above ketoximosilane mixture, 2.4 parts of a fluorocarbon alcohol (FC-10), 0.4 part of beta-aminoethyl-gamma-amino-propyltrimethoxysilane, 0.4 part of gamma-glycidoxypropyltimethoxysilane, 0.07 part of dibutyl tin dilaurate 4 parts of methyltrimethoxysilane, 1 part of diisopropoxy di(ethoxyacetoacetyl) titanate, 1.1 parts of the reaction product of the FC-10 fluorocarbon alcohol and the ketoximosilane mixture has an average formula

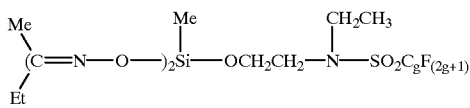

wherein g has an average value of 7, and 0.6 part impurities was added and stirred for one minute under 74.29 kPa vacuum. The FC-10 was sold by Minnesota Mining and Manufacturing Company (3M), Minneapolis, Minn., and was a mixture of species from the formula

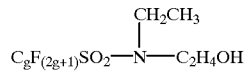

in which g has a value of from 6 to 10. Next, 60 parts of stearic acid treated precipitated calcium carbonate filler having an average particle diameter of about 0.04 micrometer and 1 part of a polymer of 2,5-furandione with 1,3-butadiene were added and stirred for 5 minutes under 74.29 kPa of vacuum. The resulting mixture was identified as a base composition and six such base mixtures were prepared. One of the base compositions was considered a control formulation and 1.75 part of tung oil was added and stirred under 74.29 kPa of vacuum. To five other base compositions, 2, 4, 6, 8, and 10 parts of particulate zinc oxide having an average particle diameter of 0.12 micrometers was added to each respectively, and each was then stirred for 5 minutes under 74.29 kPa of vacuum. To each composition, 0.216 part of diiodomethyl p-tolyl sulfone (Amical 50 purchased from Angus Chemical Company, Northbrook, Ill., U.S.A.) was added and then the mixture was stirred for 5 minutes under 74.29 kPa vacuum. To each such composition prepared, 1.75 parts of tung oil was added and stirred one minute under 74.29 kPa of vacuum. Each resulting formulation was then packaged in Semco™ tubes, made by Courtlands Aerospace, Calif., and centrifuged to eliminate any entrained air. Samples of each of the 6 formulations were cast as 5.08 by 5.08 cm slabs of 0.254 cm thickness on aluminum panels and allowed to cure for 5 days at 21° C. and 50% relative humidity. After 5 days cure, each of the test panels had developed a matte finish which was indicative of a tung oil modified sealant surface. Test panels containing the 6 formulations were placed in a OUV accelerated weathering chamber using a QUV A 340 light source with a cycle of 8 hours ultraviolet radiation exposure at 70° C. followed by 4 hours of condensing humidity at 50° C. These evaluations were done in accordance with ASTM D 4587-86. The QUV™ Tester was from Q-Panel Corp., Cleveland, Ohio. After 979 hours in the QUV chamber, the control and the sample which contain 2 parts of zinc oxide no longer exhibited the matte finish which indicated that the tung oil surface modification was no longer present. Those samples which contained 4, 6, 8, and 10 parts of zinc oxide still had a matte finish after 979 hours in the QUV chamber. The diiodomethyl p-tolyl sulfone degraded when exposed to UV and yellowed (formation of chromophore) and for this reason the yellowness of the test panels were measured at different time intervals in the QUV chamber.

The yellowness of each test panel was determined initially using Reflectance Spectrophotometry (Macbeth spectrophotometer) according to ASTM D 1925 to provide the yellowness index. The yellowness was also determine after 323 hours in the QUV chamber, and after 979 hours in the QUV chamber. The yellowness index (YI) were as shown in Table I.

TABLE I

| PARTS, ZINC OXIDE | YI INITIALLY | YI AFTER 323 HOURS | YI AFTER 979 HOURS |
|---|---|---|---|
| 0 | 113.76 | 127.18 | 119.10 |
| 2 | 113.77 | 120.43 | 115.36 |
| 4 | 112.69 | 120.22 | 115.38 |
| 6 | 112.31 | 118.68 | 115.09 |
| 8 | 112.42 | 115.60 | 113.35 |
| 10 | 114.61 | 111.65 | 110.93 |

Six RTV silicone compositions were prepared as described above except that no diiodomethyl p-tolyl sulfone was added and the combined amount of calcium carbonate filler and zinc was kept constant at 60 parts per 100 parts of polydimethylsiloxane, e.g. the control composition=60 parts of calcium carbonate, the composition containing 2 parts zinc oxide had 58 parts calcium carbonate, the composition containing 4 parts zinc oxide had 56 parts calcium carbonate, and the like. The combined parts of zinc oxide and calcium carbonate were kept constant to avoid any potential variations of the physical properties due to change of pigment to binder ratio. Each resulting formulation was then packaged in Semco™ tubes and centrifuged to eliminate any entrained air. Samples of each of the six formulations were cast as 5.08 by 5.08 cm slabs 0.254 cm thickness on polyethylene sheets and allowed to cure for 14 days at 21° C. and 50% relative humidity. After 14 days cure, each of the test panels had developed a matte finish which was indicative of a tung oil modified sealant surface. Test panels containing the six formulations were placed in the QUV chamber described above. After 650 hours, none of the test panels had yellowed compared to initial observations. These results illustrated that the yellow color was due to the degradation of the fungicide and that the presence of the zinc oxide delayed or hindered the development of the color. After 650 hours in the QUV Tester, inspection of the surface of the control formulation showed that the tung oil surface was deteriorating as the matte finish was disappearing whereas the surfaces of those formulation containing the zinc oxide showed no signs of loss of surface tung oil layer so indicated because the matte finish was still equivalent to the matte finish initially observed. These results illustrated that zinc oxide in an RTV silicone formulation increased the longevity of the the drying oil on its surface.

Each of the six formulations were also tested for durometer using the Shore A scale by ASTM D 2240, and testing according to ASTM D 412, the tensile strength at break and reported in kPa (kilopascals), the elongation at break reported in percent, and 100% modulus reported in kPa. The results of these test were as reported in the Table II.

TABLE II

| PROPERTY | AMOUNT OF ZINC OXIDE IN FORMULATION, in parts | | | | | |
|---|---|---|---|---|---|---|
| | 0 | 2 | 4 | 6 | 8 | 10 |
| DUROMETER | 19 | 20 | 18 | 20 | 19 | 19 |
| TENSILE AT BREAK, kPa | 1880 | 1820 | 1660 | 2030 | 1770 | 2010 |
| ELONGATION, % | 1004 | 1087 | 1045 | 1192 | 1069 | 1169 |
| 100% MODULUS, kPa | 260 | 230 | 230 | 230 | 230 | 230 |

The cured physical properties were not functionally effected by the presence of the zinc oxide.

That which is claimed is:

1. A non-acidic room temperature curable silicone sealant composition comprising a polymer with moisture condensable silyl ends, ketoximosilicon compound having at least three silcon bonded ketoximo groups per molecule as a crosslinking agent, a filler, an ultraviolet radiation degradable fungicide, at least 2 parts by weight of particulate zinc oxide per 100 parts by weight of the polymer, and a curing catalyst which is a combination of titanate catalyst and tin catalyst.

2. The composition according to claim 1 in which the fungicide is diiodomethyl p-tolyl sulfone.

3. The composition according to claim 1 in which the room temperature curable silicone sealant composition also comprises a drying oil.

4. The composition according to claim 2 in which the room temperature curable silicone sealant composition also comprises a drying oil.

5. The composition according to claim 3 in which the drying oil is tung oil.

6. The composition according to claim 4 in which the drying oil is tung oil.

7. The composition according to claim 1 in which the room temperature curable silicone sealant composition also comprises a fluorinated compound.

8. The composition according to claim 2 in which the room temperature curable silicone sealant composition also comprises a fluorinated compound.

9. The composition according to claim 3 in which the room temperature curable silicone sealant composition also comprises a fluorinated compound.

10. The composition according to claim 4 in which the room temperature curable silicone sealant composition also comprises a fluorinated compound.

11. The composition according to claim 5 in which the room temperature curable silicone sealant composition also comprises a fluorinated compound.

12. The composition according to claim 6 in which the room temperature curable silicone sealant composition also comprises a fluorinated compound.

13. The composition according to claim 7 in which the fluorinated compound is a fluorinated alcohol containing more than 13 fluorine atoms per molecule.

14. The composition according to claim 12 in which the fluorinated compound is a fluorinated alcohol containing more than 13 fluorine atoms per molecule.

15. The composition according to claim 1 further comprising storing the non-acidic room temperature vulcanizable silicone composition in a first package and the drying oil in a second package.

16. A method of reducing the tendency of a ultraviolet radiation degradable fungicide to cause discoloration of a non-acidic room temperature vulcanizable silicone sealant comprising (A) mixing particulate zinc oxide into a non-acidic room temperature curable silicone sealant composition comprising an ultraviolet radiation degradable fungicide, a polymer with moisture condensable silyl ends, a crosslinking agent, and a filler where the zinc oxide is added in an amount of at least 2 parts by weight per 100 parts by weight of the polymer, (B) exposing the resulting mixture of (A) to atmospheric moisture producing a cured sealant, and (C) exposing the cured sealant to ultraviolet radiation.

17. A method according to claim 16 where the fungicide is diiodomethyl p-tolyl sulfone.

18. A method according to claim 16 where the crosslinking agent is a ketoximosilicon compound having at least three silicon-bonded ketoximo groups per molecule.

19. A method according to claim 16 further comprising a curing catalyst.

20. A method according to claim 19 where the curing catalyst is a titanate catalyst.

21. A method according to claim 19 where the curing catalyst is a tin catalyst.

22. A method according to claim 19 where the curing catalyst is a combination of titanate catalyst and tin catalyst.

23. A method according to claim 16 further comprising adding a drying oil to the silicone sealant composition.

24. A method according to claim 23, where the drying oil is tung oil.

25. A method according to claim 16 further comprising adding a fluorinated compound to the silicon sealant composition.

* * * * *